United States Patent
Cho et al.

(10) Patent No.: US 11,379,362 B2
(45) Date of Patent: Jul. 5, 2022

(54) MEMORY SYSTEM AND OPERATING METHOD THEREOF

(71) Applicant: SK hynix Inc., Gyeonggi-do (KR)

(72) Inventors: Young Ick Cho, Gyeonggi-do (KR); Byeong Gyu Park, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/315,942

(22) Filed: May 10, 2021

(65) Prior Publication Data
US 2022/0171706 A1 Jun. 2, 2022

(30) Foreign Application Priority Data
Nov. 30, 2020 (KR) .................. 10-2020-0164592

(51) Int. Cl.
*G06F 12/02* (2006.01)
*G06F 12/0831* (2016.01)

(52) U.S. Cl.
CPC ...... *G06F 12/0292* (2013.01); *G06F 12/0238* (2013.01); *G06F 12/0833* (2013.01); *G06F 2212/7201* (2013.01)

(58) Field of Classification Search
CPC ............. G06F 12/0292; G06F 12/0833; G06F 12/0238; G06F 2212/7201
See application file for complete search history.

(56) References Cited

U.S. PATENT DOCUMENTS

| | | | |
|---|---|---|---|
| 6,882,993 B1 * | 4/2005 | Lawande ............ | G06F 16/2393 707/999.102 |
| 7,191,306 B2 * | 3/2007 | Myoung .......... | G11C 29/56004 711/E12.008 |
| 10,019,320 B2 * | 7/2018 | Talagala .................. | G06F 3/064 |

(Continued)

FOREIGN PATENT DOCUMENTS

KR 10-1533744 B1 7/2015

OTHER PUBLICATIONS

K. Han and D. Shin, "Remap-based Inter-Partition Copy for Arrayed Solid-State Drives," in IEEE Transactions on Computers, 2021.*

(Continued)

*Primary Examiner* — Pierre Michel Bataille
(74) *Attorney, Agent, or Firm* — IP & T GROUP LLP

(57) ABSTRACT

An operating method of a memory system includes determining that a map management operation is triggered, based on physical-to-logical (P2L) entries generated after a previous map management operation is completed, wherein the P2L entries respectively correspond to physical addresses of a memory region of a storage medium; generating a pre-update table corresponding to the memory region based on the P2L entries regardless of whether a write operation of the storage medium is completed; updating L2P entries based on the P2L entries after the write operation is completed; and generating, a new original update table by merging the pre-update table and an original update table corresponding to the memory region when the original update table is (Continued)

present in the storage medium and generating, after the L2P entries are updated, the pre-update table as the new original update table when the original update table is not present in the storage medium.

20 Claims, 12 Drawing Sheets

(56) References Cited

U.S. PATENT DOCUMENTS

| | | | | |
|---|---|---|---|---|
| 2013/0297880 | A1* | 11/2013 | Flynn | H05K 7/1487 |
| | | | | 711/135 |
| 2016/0350325 | A1* | 12/2016 | Wang | G06F 3/0608 |
| 2020/0201774 | A1* | 6/2020 | Park | G06F 9/3814 |
| 2020/0310962 | A1* | 10/2020 | Mulholland | G06F 3/0665 |

OTHER PUBLICATIONS

Y.-K. Suh, B. Moon, A. Efrat, J.-S. Kim and S.-W. Lee, "Extent Mapping Scheme for Flash Memory Devices," 2012 IEEE 20th International Symposium on Modeling, Analysis and Simulation of Computer and Telecommunication Systems, 2012, pp. 331-338.*

* cited by examiner

MEMORY SYSTEM AND OPERATING METHOD THEREOF

CROSS-REFERENCE TO RELATED APPLICATION

This application claims priority under 35 U.S.C. § 119 to Korean Patent Application No. 10-2020-0164592 filed on Nov. 30, 2020, which is incorporated herein by reference in its entirety.

BACKGROUND

1. Field

Various embodiments relate to a memory system, and more particularly, to a memory system including a nonvolatile memory device.

2. Discussion of the Related Art

A memory system may be configured to store data provided by a host device, in response to a write request from the host device. Furthermore, the memory system may be configured to provide data stored therein to the host device, in response to a read request from the host device. The host device is an electronic device capable of processing data, and examples thereof may include a computer, a digital camera or a mobile phone. The memory system may be embedded in the host device to operate or may be fabricated in a separable form and connected to the host device to operate.

SUMMARY

Various embodiments of the present disclosure are directed to providing a memory system efficiently performing a map management operation and an operating method thereof.

In an embodiment of the present disclosure, an operating method of a memory system may include: determining that a map management operation is triggered, based on physical-to-logical (P2L) entries generated after a previous map management operation is completed, wherein the P2L entries respectively correspond to physical addresses of a memory region of a storage medium; generating a pre-update table corresponding to the memory region based on the P2L entries regardless of whether a write operation of the storage medium is completed, wherein the pre-update table includes pre-update states respectively corresponding to all logical-to-physical (L2P) segments and each of the pre-update states indicates whether a corresponding L2P segment includes an L2P entry correspond to a logical address included in the P2L entries; updating L2P entries based on the P2L entries after the write operation is completed; and generating, after the L2P entries are updated, a new original update table by merging the pre-update table and an original update table corresponding to the memory region when the original update table is present in the storage medium and generating, after the L2P entries are updated, the pre-update table as the new original update table when the original update table is not present in the storage medium.

In an embodiment of the present disclosure, an operating method of a memory system may include: generating physical-to-logical (P2L) entries respectively corresponding to physical addresses of a memory region of a storage medium, wherein the P2L entries include logical addresses mapped to the physical addresses, respectively; a pre-update table by setting, as a first state, pre-update states of first L2P segments including logical-to-physical (L2P) entries respectively corresponding to the logical addresses among all L2P segments and setting, as a second state, pre-update states of second L2P segments except the first L2P segments among all the L2P segments, when the storage medium is performing a write operation when a map management operation is triggered; and generating, after the write operation is completed, a new original update table by merging the pre-update table and an original update table corresponding to the memory region when the original update table is present in the storage medium and generating, after the write operation is completed, the pre-update table as the new original update table when the original update table is not present in the storage medium.

In an embodiment of the present disclosure, a memory system may include a logical-to-physical (L2P) update component suitable for updating, when a map management operation is triggered, L2P entries based on physical-to-logical (P2L) entries generated after a previous map management operation is completed, wherein the P2L entries respectively include logical addresses mapped to physical addresses of a memory region of a storage medium and the L2P entries respectively include the physical addresses mapped to the logical addresses; pre-update table generator suitable for generating, before the L2P entries are updated, a pre-update table including respective pre-update states of all L2P segments by setting, as a first state, the pre-update states of the L2P segments including the L2P entries to be updated; and an original update table generator suitable for generating, after the L2P entries are updated, a new original update table by merging the pre-update table and an original update table corresponding to the memory region when the original update table is present in the storage medium and generating, after the L2P entries are updated, the pre-update table as the new original update table when the original update table is not present in the storage medium.

In an embodiment of the present disclosure, an operating method of a controller may include: generating a physical-to-logical (P2L) entry for access to a memory unit for a current term; reflecting the P2L entry into a current-term-change table; reflecting, into a so-far-change table for the current term, the current-term-change table and the so-far-change table for a previous term, which is read from a nonvolatile memory device; and controlling the memory device to store therein the so-far-change table for the current term, wherein the current-term-change table includes a change status for the current term of a logical-to-physical (L2P) segment including a L2P entry, and wherein the so-far-change tables for the previous and current terms include the change statuses respectively up to the previous and current terms of the L2P segment.

DETAILED DESCRIPTION

Figure 1:
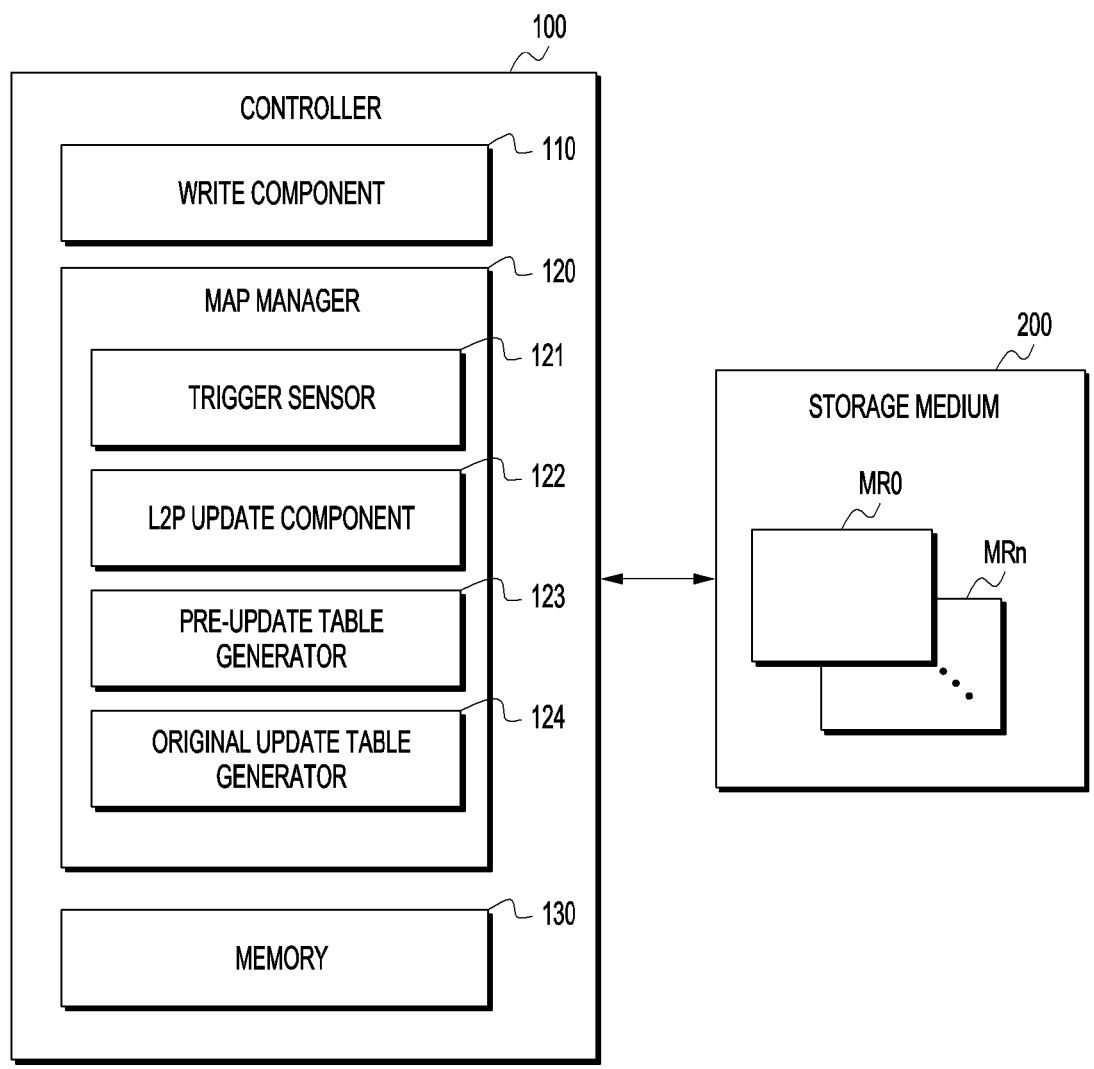
FIG. 1 is a block diagram illustrating a memory system according to an embodiment of the present disclosure.

Various embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Advantages and characteristics of this disclosure and methods of achieving them will be described through embodiments to be described later in detail along with the accompanying drawings. However, this disclosure is not limited to the embodiments described herein, and may be materialized in other forms. The present embodiments are provided to describe this disclosure in detail to the extent that a person having ordinary skill in the art may readily carry out the technical spirit of this disclosure.

In the drawings, embodiments of the present disclosure are not limited to specific forms illustrated in the drawings and have been exaggerated for clarity. Specific terms have been used in the specification, but the terms are used to only describe the present disclosure, not to limit the meaning of the terms or the scope of right of the present disclosure written in the claims.

In the specification, the expression "and/or" is used as having a meaning including at least one of elements listed before and after the expression. Furthermore, the expression "connected/coupled" is used as having a meaning including that one element is directly connected to another element and that the two elements are indirectly connected through still another element. In the specification, the singular form includes the plural form unless specially described otherwise. Furthermore, terms, such as "includes or comprises" and/or "including or comprising" used in the specification, mean the existence or addition of one or more other elements, steps, operations and/or devices, in addition to the described elements, steps, operations and/or devices.

Hereinafter, embodiments are described in detail with reference to the accompanying drawings.

FIG. 1 is a block diagram illustrating a memory system 10 according to an embodiment of the present disclosure.

The memory system 10 may be configured to store data provided by an external host device, in response to a write request from the host device. Furthermore, the memory system 10 may be configured to provide data stored therein to the host device, in response to a read request from the host device.

The memory system 10 may include a personal computer memory card international association (PCMCIA) card, a compact flash (CF) card, a smart media card, a memory stick, various multimedia cards (e.g., an MMC, an eMMC, an RS-MMC, and an MMC-micro), secure digital (SD) cards (e.g., a Mini-SD and a Micro-SD), a universal flash storage (UFS) or a solid state drive (SSD).

The memory system 10 may include a controller 100 and a storage medium 200.

The controller 100 may control an overall operation of the memory system 10. The controller 100 may control the storage medium 200 to perform a foreground operation in response to an instruction from the host device. The foreground operation may include an operation of writing data in the storage medium 200 and reading data from the storage medium 200, in response to instructions from the host device, that is, a write request and a read request.

Furthermore, the controller 100 may control the storage medium 200 to perform, independently of the host device, a background operation that is internally necessary. The background operation may include at least one of a wear-leveling operation, a garbage collection operation, an erase operation, a read reclaim operation, and a refresh operation for the storage medium 200. Like the foreground operation, the background operation may include an operation of writing data in the storage medium 200 and reading data from the storage medium 200.

The controller 100 may include a write component 110, a map manager 120, and a memory 130. The write component 110 and the map manager 120 may be configured as software, hardware, or firmware or may be configured by a combination thereof.

The write component 110 may control the storage medium 200 to perform a write operation on a target memory component of a target memory region, in response to a write request from the host device. For example, the write component 110 may transmit, to the storage medium 200, a write command including a physical address of the target memory unit.

The write component 110 may control a write operation of the storage medium 200 and may generate, in the memory 130, a physical-to-logical (P2L) entry corresponding to a physical address of a target memory unit. The P2L entry of data stored in the target memory unit may include a logical address mapped to the physical address of the target memory unit, that is, the logical address of the data stored in the target memory unit.

The map manager 120 may generally manage map data indicative of a mapping relation between logical addresses corresponding to data transmitted by the host device and physical addresses of the storage medium 200. The map data may include, as well as the above-described P2L entry, a logical-to-physical (L2P) entry corresponding to each logical address. The L2P entry may include a physical address mapped to a corresponding logical address, that is, a physical address of a memory unit that stores data of the corresponding logical address. As will be described later, the L2P entry may be managed in an L2P segment unit for a plurality of logical addresses.

The map manager 120 may perform a map management operation, to be described later, to process a plurality of P2L entries generated with respect to a target memory region. In this case, the plurality of P2L entries processed through the map management operation may be generated until a current map management operation is triggered after a previous map management operation is completed. The map manager 120 may process new P2L entries for the target memory region whenever the map management operation is performed.

The map manager 120 may include a trigger sensor 121, an L2P update component 122, a pre-update table generator 123, and an original update table generator 124.

The trigger sensor 121 may determine whether a map management operation has been triggered, i.e., may sense a trigger condition of the map management operation. The map management operation may be triggered when a P2L memory portion in which a P2L entry is stored within the memory 130 is full, for example. According to an embodiment, the map management operation may be triggered when a given number of P2L entries are generated in the P2L memory portion. According to an embodiment, the map management operation may be triggered when a target memory region in which data is being stored within the storage medium 200 is full. According to an embodiment, the map management operation may be triggered when a given time elapses after a previous map management operation is performed. The map management operation may be performed plural times according to a trigger condition while the target memory region is filled with data.

The map management operation may include a sequence of a pre-update table generation operation, an L2P update operation and an original update table generation operation. The pre-update table generation operation may be an operation of the pre-update table generator 123. The L2P update operation may be an operation of the L2P update component 122. The original update table generation operation may be an operation of the original update table generator 124.

The L2P update operation is first described below. The L2P update component 122 may perform an L2P update operation for updating an L2P entry based on a P2L entry to keep the L2P entry up-to-date. That is, when the host device updates data, the updated data is stored in a memory unit of a new physical address although the updated data corresponds to the same logical address without any change. Accordingly, the L2P update component 122 may perform the L2P update operation in order to incorporate the new physical address into the L2P entry.

When a map management operation is triggered, if the storage medium 200 is still performing a write operation, the L2P update component 122 may wait for completion of the write operation and may perform an L2P update operation after the write operation of the storage medium 200 is completely performed (i.e., after the write operation is successful) in order to prevent an error attributable to a map data mismatch, etc. Furthermore, as will be described later, the L2P update operation includes an operation of reading an L2P segment from the storage medium 200. Accordingly, if the storage medium 200 is performing any storage-access operation such as a write operation, it may be difficult for the storage medium 200 to perform the L2P update operation simultaneously with the storage-access operation in progress.

After an L2P update operation is performed, the original update table generator 124 may perform an original update table generation operation to generate an original update table corresponding to a target memory region. The original update table may indicate L2P segments updated as data is stored in the target memory region. While the target memory region is filled with the data, whenever a map management operation is performed plural times, the original update table generator 124 may continue to update the original update table of the target memory region. An update table finally generated after the target memory region is full of the data may be referred to when the target memory region is selected as a victim of a garbage collection operation, as will be described later.

At this time, when a map management operation is triggered, first, the pre-update table generator 123 may generate a pre-update table of the target memory region. The original update table generator 124 may generate a new original update table by merging the pre-update table and an original update table generated through a previous map management operation.

The pre-update table generation operation is described below. When a map management operation is triggered, first, the pre-update table generator 123 may generate a pre-update table corresponding to a target memory region based on P2L entries, which are generated until a current map management operation is triggered after a previous map management operation is completed. The pre-update table may indicate pre-update statuses of L2P segments including L2P entries to be updated based on the P2L entries, which are generated until the current map management is triggered after the previous map management operation is completed. The pre-update table may indicate the pre-update statuses of L2P segments including L2P entries to be updated in a subsequent L2P update operation. The pre-update table may include update states, i.e., the pre-update states of L2P segments, respectively, for a term between when the previous map management operation is completed and when the current map management operation is triggered.

As a result, an original update table generated in a previous map management operation with respect to a target memory region indicates L2P segments which are updated because of storing data in the target memory region until the previous map management operation is triggered. A pre-update table indicates L2P segments which are updated because of storing data in the target memory region until the current map management operation is triggered after the previous map management operation is completed. As a result, a new original update table in which the original update table and the pre-update table are merged may indicate L2P segments which are updated because of storing data in the target memory region until the current map management operation is triggered.

If a previously generated original update table is not present in the storage medium 200 when a pre-update table corresponding to a target memory region is generated, the pre-update table may become the original update table corresponding to the target memory region. That is, for an initial term without a previous term, the pre-update table may first become the original update table.

In the present disclosure, the pre-update table generation operation may be performed while the storage medium 200 is performing a write operation. Specifically, when a map management operation is triggered, if the storage medium 200 is storing a very large amount of data, a write operation may be performed for a very long time. In this case, while the storage medium 200 is performing the write operation, the pre-update table generator 123 may perform a pre-update table generation operation without waiting for the completion of the write operation of the storage medium 200. That is, in an embodiment of the present disclosure, the pre-update table generation operation may be performed while the storage medium 200 is performing a write operation because the pre-update table generation operation is an operation performed within the controller 100 and therefore is not related to access (such as the write operation) to any storage region within the storage medium 200. The pre-update table generation operation may be performed in parallel with the write operation of the storage medium 200.

The L2P update operation, which requires access to the storage medium 200 such as the read operation of reading a L2P segment from the storage medium 200, needs to be performed after a previous access to the storage medium 200 such as a write operation of the storage medium 200 is completed, but the pre-update table generation operation, which does not require access to the storage medium 200, may be performed regardless of the completion of the write operation of the storage medium 200. Furthermore, as will be described later, to generate an update table, there is a need for a process of checking a plurality of P2L entries one by one, which requires a long time. Such a check process may be processed in the pre-update table generation operation. Accordingly, a total time taken to execute a map management operation can be effectively reduced using the waiting time for a completion of a write operation of the storage medium 200.

The memory 130 is a working memory and may store a software program and various operation data. The memory may include a volatile memory device. The volatile memory device may include a dynamic random access memory (DRAM) or a static random access memory (SRAM).

Figure 2:
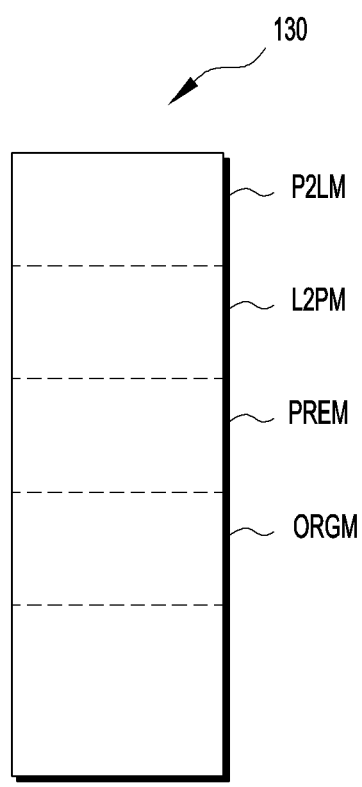
FIG. 2 is a diagram illustrating an allocation for a memory according to an embodiment of the present disclosure.

FIG. 2 is a diagram illustrating an allocation for the memory 130 according to an embodiment of the present disclosure.

Referring to FIG. 2, the memory 130 may include an L2P memory portion L2PM, a P2L memory portion P2LM, a pre-update table memory portion PREM, and an original update table memory portion ORGM.

The L2P memory portion L2PM may be used to store L2P entries. The P2L memory portion P2LM may be used to store P2L entries. The pre-update table memory portion PREM may be used to store a pre-update table. The original update table memory portion ORGM may be used to store an original update table.

The memory portions L2PM, P2LM, PREM, and ORGM may be located in one memory device or a plurality of separate memory devices.

Referring back to FIG. 1, the storage medium 200 may include a plurality of memory regions MR0 to MRn. Each of the memory regions may be a unit by which an erase operation is performed in the storage medium 200. That is, data stored in the memory regions may be erased together. For example, the memory regions may be memory blocks included in a single nonvolatile memory device. For another example, the memory regions may be a set of memory blocks which are included in a plurality of nonvolatile memory devices, respectively, and can be accessed in parallel. Each of the memory regions may be a super block, for example.

Each of the memory regions may include a plurality of memory units corresponding to contiguous physical addresses, respectively. Each of the memory units may be a unit by which a write operation or a read operation is performed in the storage medium 200. The controller 100 may store data in the memory units in order of the physical addresses. Each of the memory units may be a page, for example.

The storage medium 200 may include one or more nonvolatile memory devices. The nonvolatile memory device may include a flash memory device such as a NAND flash or a NOR flash, a ferroelectric random access memory (FeRAM), a phase-change random access memory (PCRAM), a magnetic random access memory (MRAM) or a resistive random access memory (ReRAM).

Figure 3:
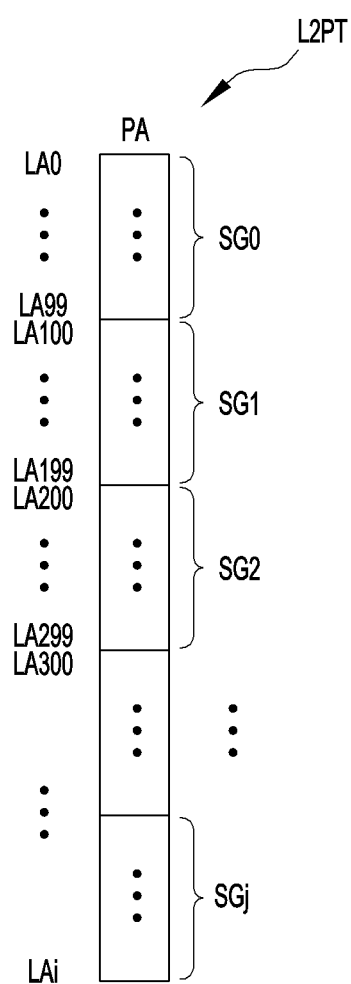
FIG. 3 is a diagram illustrating an L2P table according to an embodiment of the present disclosure.

FIG. 3 is a diagram illustrating an L2P table (L2PT) according to an embodiment of the present disclosure.

Referring to FIG. 3, the L2PT may include a plurality of L2P entries corresponding to logical addresses LA0 to LAi, respectively. Each of the L2P entries may indicate mapping information between a logical address of data and a physical address of a memory unit in which the data is stored. For example, the L2PT may include physical addresses PA which use the contiguous logical addresses LA0 to LAi as indices and are mapped to the logical addresses LA0 to LAi, respectively. The logical addresses LA0 to LAi may be addresses corresponding to data transmitted by the host device. The logical addresses LA0 to LAi may be addresses used for the host device to access the memory system 10.

When the capacity of the memory 130 is very small or for efficient use of the memory, the entire L2PT may be maintained in the storage medium 200, and only some of the L2PT may be referred to in the memory 130. In this case, the controller 100 may load the L2PT in a given segment unit. That is, when attempting to update an L2P entry, the controller 100 may read all L2P segments, including the L2P entry, into the memory 130.

For example, the controller 100 may divide the logical addresses LA0 to LAi into L2P segments SG0 to SGj by contiguously splitting the logical addresses LA0 to LAi by 100. For example, the logical address LA0 to the logical address LA99 may constitute the L2P segment SG0. The logical address LA100 to the logical address LA199 may constitute the L2P segment SG1.

The L2P segment is referred to through contiguous logical addresses, that is, indices. Accordingly, to which physical address a specific logical address has been mapped can be easily checked by referring to the L2P segment.

Figure 4:
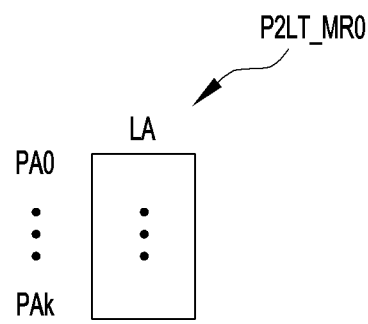
FIG. 4 is a diagram illustrating a P2L table of a memory region according to an embodiment of the present disclosure.

FIG. 4 is a diagram illustrating a P2L table P2LT_MR0 of the memory region MR0 according to an embodiment of the present disclosure.

Referring to FIG. 4, the P2L table P2LT_MR0 of the memory region MR0 may include a plurality of P2L entries corresponding to physical addresses PA0 to PAk, respectively. Each of the P2L entries may indicate mapping information between a corresponding physical address and a logical address of data stored in a memory unit of the corresponding physical address. For example, the P2L table P2LT_MR0 may include logical addresses LA which use, as indices, the contiguous physical addresses PA0 to PAk of memory units included in the memory region MR0 and are mapped to the contiguous physical addresses PA0 to PAk.

The P2L table P2LT_MR0 is referred to through the contiguous physical addresses PA0 to PAk, that is, indices. Accordingly, to which logical address a specific physical address is mapped can be easily checked by referring to the P2L table P2LT_MR0. Accordingly, while a write operation of the storage medium 200 is performed, a P2L entry including a physical address may be first generated, and an L2P entry may be updated based on the P2L entry, as will be described with reference to FIG. 5.

Figure 5:
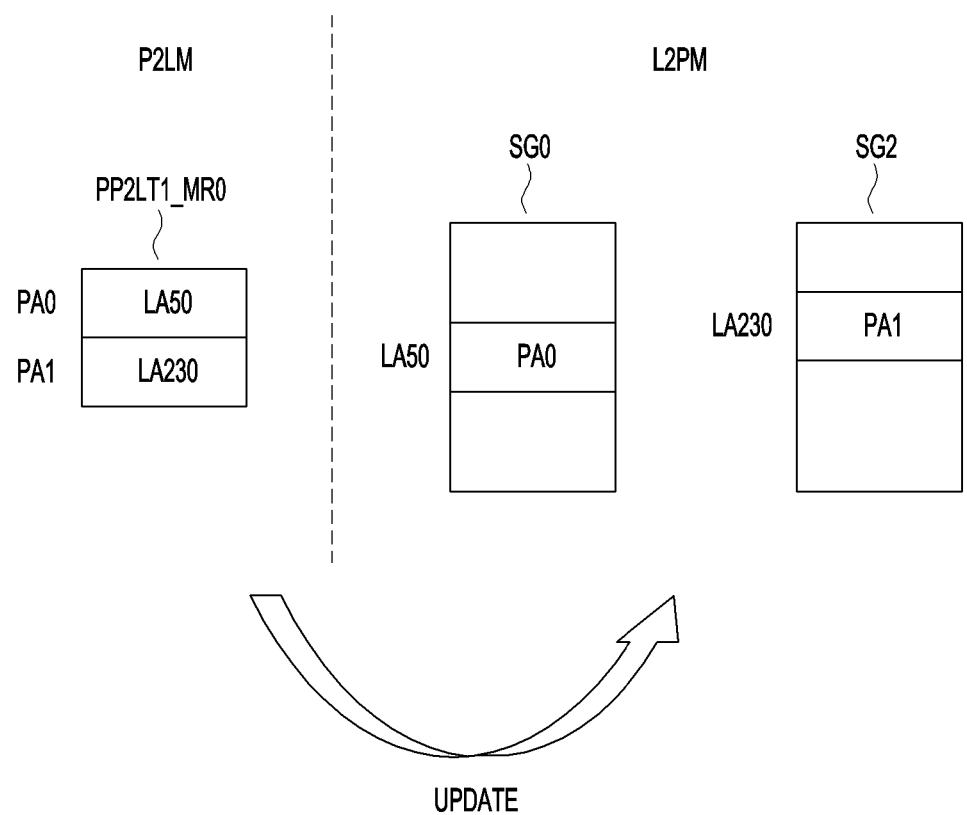
FIG. 5 is a diagram for describing an L2P update operation according to an embodiment of the present disclosure.

FIG. 5 is a diagram for describing an L2P update operation according to an embodiment of the present disclosure.

Referring to FIG. 5, the L2P update component 122 may update L2P entries based on P2L entries through an L2P update operation.

Specifically, the P2L memory portion P2LM of the memory 130 may store P2L entries corresponding to physical addresses PA0 and PA1 of a target memory region MR0. The P2L entries respectively including the physical addresses PA0 and PA1 may be generated until a current map management operation is triggered after a previous map management operation is completed.

The L2P update component 122 may first identify a logical address LA50 with reference to a P2L entry including the physical address PA0, may read, from the storage medium 200 to the L2P memory portion L2PM of the memory 130, an L2P segment SG0 including an L2P entry including the logical address LA50, and may update the L2P entry including the logical address LA50 so that the physical address PA0 is mapped to the logical address LA50 in the L2P segment SG0. Likewise, the L2P update component 122 may identify a logical address LA230 with reference to a P2L entry including the physical address PA1, may read, from the storage medium 200 to the L2P memory portion L2PM of the memory 130, an L2P segment SG2 including an L2P entry including the logical address LA230, and may update the L2P entry including the logical address LA230 so that the physical address PA1 is mapped to the logical address LA230 in the L2P segment SG2. The L2P update component 122 may store the updated L2P segments SG0 and SG2 in the storage medium 200 again.

According to an embodiment, when the P2L memory portion P2LM of the memory 130 is full of P2L entries, a map management operation may be triggered. That is, in a map management operation, when L2P entries are updated to incorporate the latest information, the P2L entries in the P2L memory portion P2LM are no longer necessary, and the P2L memory portion P2LM may be used to store new P2L entries.

Furthermore, when the capacity of the P2L memory portion P2LM is small, the P2L memory portion P2LM may not store the entire P2L table P2LT_MR0 of a target memory region MR0, such as that illustrated in FIG. 3, but be full of P2L entries by storing, in the P2L memory portion P2LM, a partial P2L table PP2LT1_MR0 for the physical addresses PA0 and PA1. In this case, after an L2P update operation is performed based on the partial P2L table PP2LT1_MR0, the P2L memory portion P2LM may store P2L entries from a P2L entry including a next physical address PA2 of the target memory region MR0.

When a map management operation is triggered while the storage medium 200 is performing a write operation on a memory unit of the physical address PA1, an L2P update operation may be performed after the write operation of the storage medium 200 is completely performed to prevent an error attributable to a map mismatch, etc. The L2P update component 122 may perform the L2P update operation based on the partial P2L table PP2LT1_MR0 after receiving a report on the success of the write operation from the storage medium 200. If a report on the failure of the write operation for the physical address PA1 is received, the write component 110 may control the storage medium 200 to perform a write operation on another physical address again. The L2P update component 122 may not perform an L2P update operation until a write operation of the storage medium 200 is successful even if a map management operation is triggered.

Figure 6:
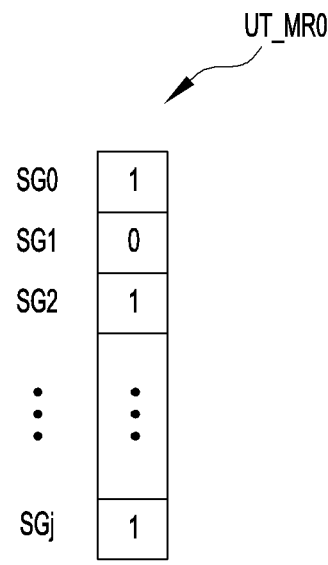
FIG. 6 is a diagram for describing an update table according to an embodiment of the present disclosure.

FIG. 6 is a diagram for describing an update table UT_MR0 according to an embodiment of the present disclosure.

FIG. 6 illustrates the update table UT_MR0 of the memory region MR0. The format of the update table UT_MR0 may represent the format of each of the pre-update table and the original update table. The update table UT_MR0 may include update states of all L2P segments SG0 to SGj stored in the storage medium 200, respectively. Each of the update states may indicate whether a corresponding L2P segment is updated or not. Whether a L2P segment is updated or not may depend of whether the L2P segment includes an L2P entry including a logical address of data stored in the memory region MR0. Each of the update states may indicate whether the corresponding L2P segment has been updated due to the data stored in the memory region MR0.

The update table UT_MR0 is not limited to such an example and may be a bit map composed of bits corresponding to the number of all the L2P segments SG0 to SGj. For example, when an update state of the L2P segment SG0 is a first state or a set state, that is, "1", this may mean that the L2P segment SG0 includes an L2P entry including a logical address of data stored in the memory region MR0. Likewise, when an update state of the L2P segment SG2 is a set state, this may mean that the L2P segment SG2 includes an L2P entry including a logical address of data stored in the memory region MR0. Such states correspond to results of update of the L2P segments SG0 and SG2 as illustrated in FIG. 5.

Furthermore, for example, when an update state of the L2P segment SG1 is a second state or a clear state, that is, "0", this may mean that the L2P segment SG1 does not include an L2P entry including a logical address of data stored in the memory region MR0.

The update table UT_MR0 may be finally completed after the memory region MR0 is full of data. L2P segments among all the L2P segments SG0 to SGj include the L2P entries of data stored in the memory region MR0 can be checked by referring to the final update table UT_MR0.

A memory region in which data is stored among the memory regions MR0 to MRn of the storage medium 200 may have an update table having the same format as the update table UT_MR0.

Figure 7:
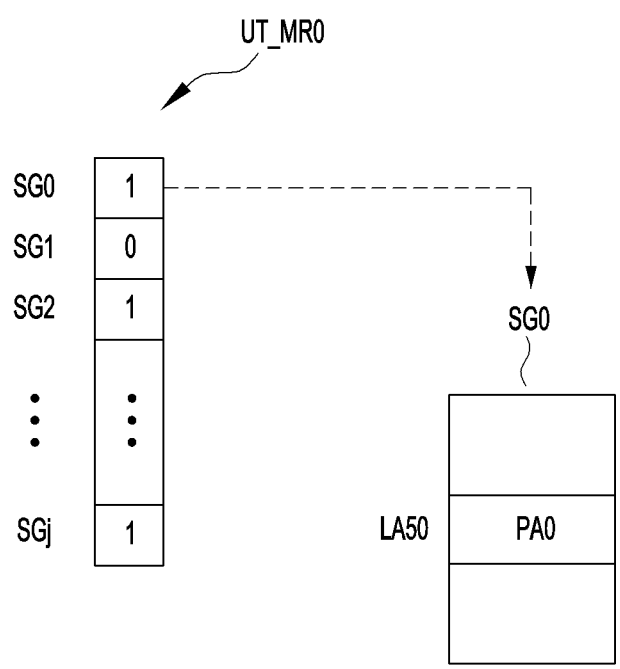
FIG. 7 is a diagram for describing a method of performing a garbage collection operation with reference to the update table according to an embodiment of the present disclosure.

FIG. 7 is a diagram for describing a method of performing a garbage collection operation with reference to the update table UT_MR0 according to an embodiment of the present disclosure.

Referring to FIG. 7, when the memory region MR0 is full of data and then selected as a victim of a garbage collection operation, valid data among the data stored in the memory region MR0 may be moved to another memory region through the garbage collection operation. Accordingly, whether the data stored in the memory region MR0 is valid data or invalid data needs to be first determined. The update table UT_MR0 of the memory region MR0 may be used to determine such valid data. Specifically, valid data stored in the memory region MR0 may be identified by identifying L2P segments having an update state of a set state with reference to the update table UT_MR0, reading the identified L2P segments from the storage medium 200, and checking physical addresses of the memory region MR0 in L2P entries included in the identified L2P segments.

More specifically, when referring to the update table UT_MR0, an update state of the L2P segment SG0 is a set state. Accordingly, the controller 100 may be aware that the L2P segment SG0 includes an L2P entry including a logical address of data stored in the memory region MR0.

Accordingly, the controller 100 may read the L2P segment SG0 from the storage medium 200 into the L2P memory portion L2PM of the memory 130 and may identify physical addresses of the memory region MR0 with reference to L2P entries of the L2P segment SG0. For example, an L2P entry including a logical address LA50 includes the physical address PA0 of the memory region MR0 mapped to the logical address LA50. Accordingly, the controller 100 may determine that data stored in the memory unit of the physical address PA0 is valid data.

That is, when the memory region MR0 is selected as a victim of a garbage collection operation, L2P entries respectively including all the logical addresses of data stored in the memory region MR0 need to be referred to. In this case, L2P segments including required L2P entries can be easily identified by referring to the update table UT_MR0. Accordingly, if the update table UT_MR0 is referred to, performance of the garbage collection operation can be improved because it is not necessary to search all the L2P segments SG0 to SGj.

Figure 8:
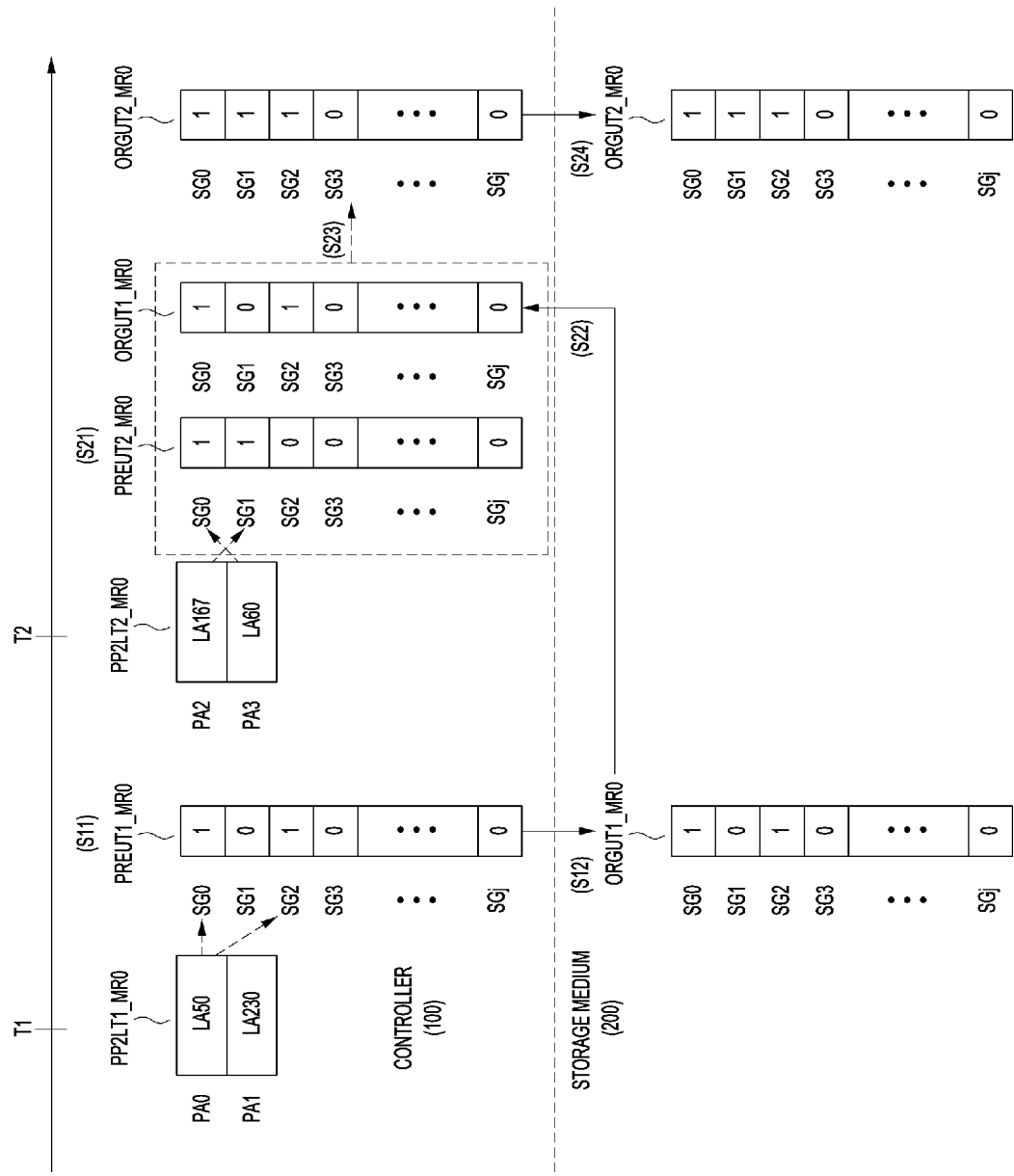
FIG. 8 is a diagram for describing a pre-update table generation operation and an original update table generation operation according to an embodiment of the present disclosure.

FIG. 8 is a diagram for describing a pre-update table generation operation and an original update table generation operation according to an embodiment of the present disclosure. As described above, an L2P update operation needs to be performed between the pre-update table generation operation and the original update table generation operation, but a process of performing the L2P update operation is omitted in FIG. 8 for easy understanding.

Referring to FIG. 8, at timing T1, the trigger sensor 121 may determine that a map management operation has been triggered. According to an embodiment, when the map management operation is triggered, the pre-update table memory portion PREM and original update table memory portion ORGM of the memory 130 may be initialized to store any initial value.

At the timing T1, a partial P2L table PP2LT1_MR0 of the target memory region MR0 may be present in the P2L memory portion P2LM of the memory 130. The partial P2L table PP2LT1_MR0 may include P2L entries respectively including physical addresses PA0 and PA1. The partial P2L table PP2LT1_MR0 may be generated until the current map management operation is triggered after a previous map management operation is completed.

At operation S11, the pre-update table generator 123 may generate a pre-update table PREUT1_MR0 in the pre-update table memory portion PREM of the memory 130 based on the partial P2L table PP2LT1_MR0. The pre-update table PREUT1_MR0 may include pre-update states of all L2P segments SG0 to SGj, respectively, for a term between when the previous map management operation is completed and when the current map management operation is triggered. Each of the pre-update states may indicate whether a corresponding L2P segment is updated or not. Whether a L2P segment is updated or not may depend on whether the L2P segment includes an L2P entry including a logical address included in any of the P2L entries of the partial P2L table PP2LT1_MR0. Specifically, when a L2P segment includes an L2P entry including a logical address included in any of the P2L entries of the partial P2L table PP2LT1_MR0, the pre-update state of the L2P segment may be set as a first state. When a L2P segment does not include any L2P entry including a logical address included in any of the P2L entries of the partial P2L table PP2LT1_MR0, the pre-update state of the L2P segment may be set as a second state. The pre-update table PREUT1_MR0 may be generated to have the same form and size as, for example, the update table UT_MR0 of FIG. 7, and may be a bit map composed of bits corresponding to the number of all the L2P segments SG0 to SGj, for example.

For example, when a P2L entry including the physical address PA0 includes a logical address LA50, the L2P entry including the logical address LA50 is included in the L2P segment SG0. Accordingly, the pre-update table generator 123 may set a pre-update state of the L2P segment SG0 as a set state, that is, "1." Furthermore, when the P2L entry including the physical address PA1 includes a logical address LA230, the L2P entry including the logical address LA230 is included in the L2P segment SG2. Accordingly, the pre-update table generator 123 may set a pre-update state of the L2P segment SG2 as a set state, that is, "1." Furthermore, the pre-update table generator 123 may set pre-update states of the remaining L2P segments except the L2P segments SG0 and SG2 among all the L2P segments SG0 to SGj as a clear state, that is, "0."

At operation S12, the original update table generator 124 may store the pre-update table PREUT1_MR0 in the storage medium 200 as an original update table ORGUT1_MR0 of the target memory region MR0. That is, when the pre-update table PREUT1_MR0 is first generated with respect to the target memory region MR0, the pre-update table PREUT1_MR0 may become the first original update table of the target memory region MR0. The pre-update table PREUT1_MR0 may be directly moved from the pre-update table memory portion PREM of the memory 130 to the storage medium 200. Accordingly, the first map management operation may be completed.

At timing T2, the trigger sensor 121 may determine that a map management operation has been triggered.

At the timing T2, a partial P2L table PP2LT2_MR0 of the target memory region MR0 may present in the P2L memory portion P2LM of the memory 130. The partial P2L table PP2LT2_MR0 may be generated subsequently to the partial P2L table PP2LT1_MR0. The partial P2L table PP2LT2_MR0 may include P2L entries respectively including physical addresses PA2 and PA3. The partial P2L table PP2LT2_MR0 may be generated until the current map management operation is triggered after the previous map management operation is completed, for example, after operation S12.

At operation S21, as in operation S11, the pre-update table generator 123 may generate a pre-update table PREUT2_MR0 in the pre-update table memory portion PREM of the memory 130 based on the partial P2L table PP2LT2_MR0. Each of pre-update states of the pre-update table PREUT2_MR0 may indicate whether a corresponding L2P segment is updated or not. Whether a L2P segment is updated or not may depend on whether the L2P segment includes an L2P entry including a logical address included in any of the P2L entries of the partial P2L table PP2LT2_MR0.

At operation S22, the original update table generator 124 may read, from the storage medium 200, the original update table ORGUT1_MR0 generated in the previous map management operation. The original update table ORGUT1_MR0 may be read into the original update table memory portion ORGM of the memory 130.

At operation S23, the original update table generator 124 may generate a new original update table ORGUT2_MR0 by merging the pre-update table PREUT2_MR0 and the original update table ORGUT1_MR0. The original update table generator 124 may generate the new original update table ORGUT2_MR0 by performing a bitwise OR operation on the pre-update table PREUT2_MR0 and the original update table ORGUT1_MR0. The new original update table ORGUT2_MR0 may be stored in the original update table memory portion ORGM.

As a result, the original update table ORGUT1_MR0 generated in the previous map management operation with respect to the target memory region MR0 indicates which L2P segments are updated by data stored in the target memory region MR0 until the previous map management operation is triggered. The pre-update table PREUT2_MR0 indicates which L2P segments are updated by data stored in the target memory region MR0 until a current map management operation is triggered after the previous map management operation is completed. As a result, the new original update table ORGUT2_MR0 in which the original update table ORGUT1_MR0 and the pre-update table PREUT2_MR0 are merged may indicate L2P segments which are updated by the data stored in the target memory region MR0 until the current map management operation is triggered.

At operation S24, the original update table generator 124 may store the new original update table ORGUT2_MR0 in the storage medium 200. That is, the new original update table ORGUT2_MR0 may be moved from the original update table memory portion ORGM to the storage medium 200. Accordingly, the second map management operation may be terminated.

Thereafter, when a new partial P2L table subsequent to the partial P2L table PP2LT2_MR0 is generated with respect to the target memory region MR0, the pre-update table generator 123 and the original update table generator 124 may repeat operations as in operations S21 to S24. The final update table (e.g., UT_MR0 of FIG. 7) for the target memory region MR0 will be generated after a P2L entry including the last physical address (e.g., PAk of FIG. 4) of the target memory region MR0 is generated and operations S21 to S24 are similarly repeated based on the last P2L entry.

According to an embodiment, at operation S12, the pre-update table PREUT1_MR0 may be moved from the pre-update table memory portion PREM of the memory 130 to the original update table memory portion ORGM thereof and may be moved from the original update table memory portion ORGM to the storage medium 200. At this time, the original update table generator 124 may perform a bitwise OR operation on initial values, that is, "0s", stored in the pre-update table PREUT1_MR0 and the original update table memory portion ORGM and may store a result of the operation, that is, the pre-update table PREUT1_MR0, in the original update table memory portion ORGM without any change.

As described above, in an embodiment of the present disclosure, the reason why the pre-update table generation operation at step S21 and the original update table generation operation at operations S22 to S24 are separated is to perform the pre-update table generation operation at operation S21 regardless of the completion of a write operation of the storage medium 200. For example, when a map management operation is triggered while the storage medium 200 is performing a write operation on the physical address PA3, for example, an L2P update operation needs to be performed after the write operation of the storage medium 200 is completely performed but the pre-update table generation operation at operation S21 may safely be performed in parallel to the write operation without waiting for the completion of the write operation. That is, since the partial P2L table PP2LT2_MR0 has already been generated regardless of a result of the write operation for the physical address PA3, the pre-update table generation operation at operation S21 based on the partial P2L table PP2LT2_MR0 may not be affected by a result of the write operation of the storage medium 200.

Furthermore, the pre-update table generation operation at operation S21 may require a relatively longer time than the bitwise OR operation simply performed at operation S23 because the P2L entries included in the partial P2L table PP2LT2_MR0 need to be checked one by one in the pre-update table generation operation. According to an embodiment of the present disclosure, the entire map management operation can be rapidly completed by previously performing the pre-update table generation operation at operation S21, which requires a relatively long time, while the write operation of the storage medium 200 is performed.

Figure 9A:
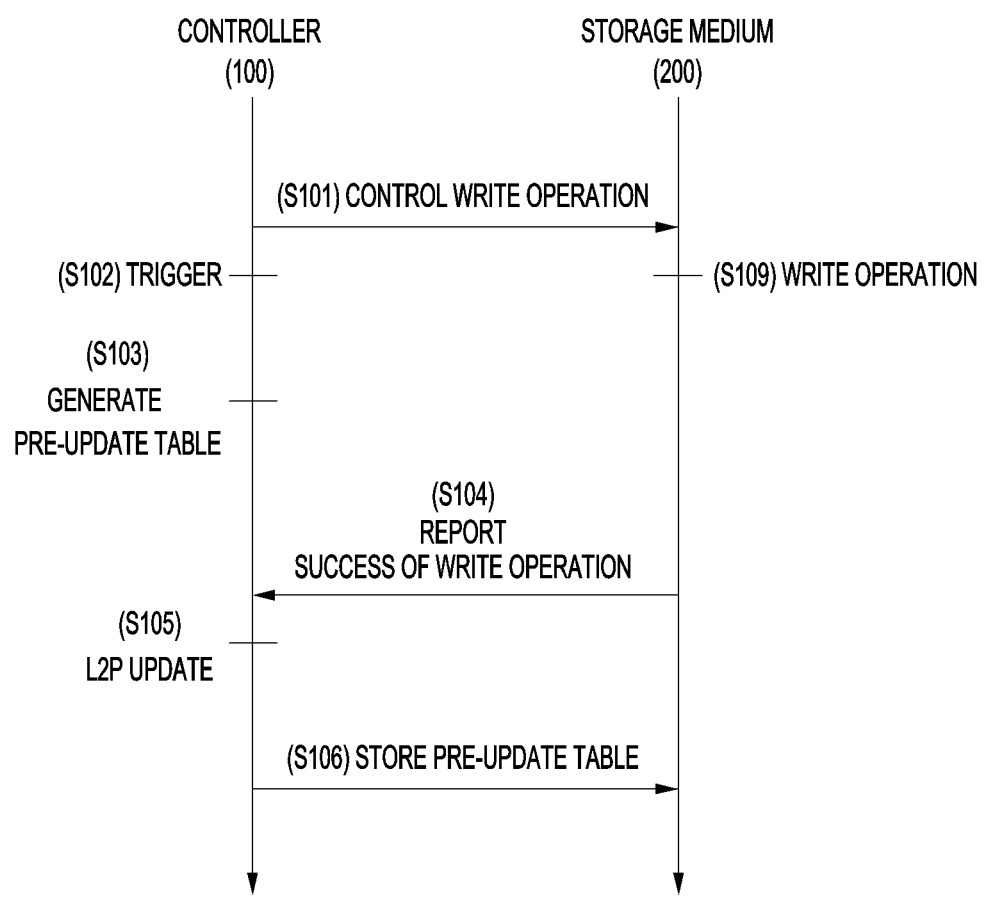
FIGS. 9A and 9B are diagrams for describing methods of performing map management operations according to an embodiment of the present disclosure.
Figure 9B:
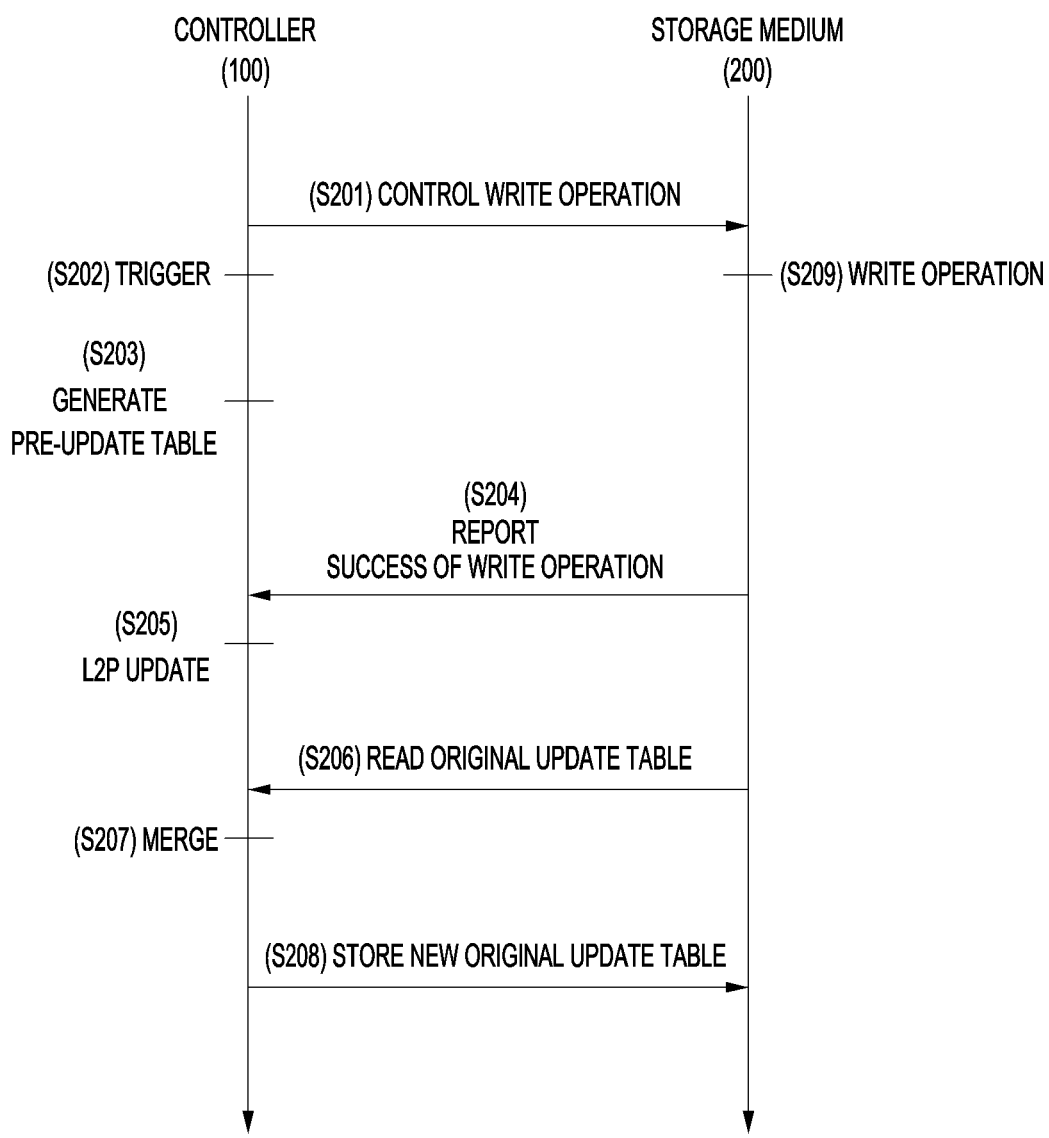

FIGS. 9A and 9B are diagrams for describing methods of performing map management operations according to an embodiment of the present disclosure.

FIG. 9A illustrates a case where a map management operation is first triggered with respect to a target memory region. In this case, at a timing at which the map management operation is triggered, an original update table previously generated with respect to the target memory region may not be present in the storage medium 200.

Operations S101 to S106 may be sequentially performed, but operation S109 may be performed in parallel to operation S103.

At operation S101, the write component 110 may control the storage medium 200 to perform a write operation on a target memory unit of a target memory region. For example, the write component 110 may transmit a write command for the target memory unit to the storage medium 200. Furthermore, the write component 110 may generate a P2L entry including a physical address of the target memory unit. The generated P2L entry may be listed in a partial P2L table of the target memory region.

At operation S109, the storage medium 200 may perform a write operation on the target memory unit of the target memory region under the control of the write component 110.

At operation S102, the trigger sensor 121 may determine that a map management operation has been triggered. If a map management operation has not been triggered, a map management operation at operations S103 to S106 may not be performed.

At operation S103, the pre-update table generator 123 may generate a pre-update table corresponding to the target memory region based on the partial P2L table of the target memory region while the storage medium 200 performs the write operation. For example, the pre-update table generator 123 may operate as in operation S11 of FIG. 8.

At operation S104, the storage medium 200 may report the success of the write operation to the controller 100.

At operation S105, the L2P update component 122 may perform an L2P update operation based on the partial P2L table of the target memory region. For example, the L2P update component 122 may operate as described above with reference to FIG. 5.

At operation S106, since an original update table previously generated with respect to the target memory region is not present in the storage medium 200, the original update table generator 124 may store the pre-update table in the storage medium 200 as the original update table of the target memory region. For example, the original update table generator 124 may operate as in operation S12 of FIG. 8.

FIG. 9B illustrates a case where a map management operation is performed on the target memory region after FIG. 9A. In this case, at a timing at which the map management operation is triggered, an original update table generated in a previous map management operation with respect to the target memory region may be present in the storage medium 200.

Referring to FIG. 9B, operations S201 to S205 and S209 may be the same as operations S101 to S105 and S109 of FIG. 9A, respectively.

At operation S206, the original update table generator 124 may read, from the storage medium 200, the original update table corresponding to the target memory region. For example, the original update table generator 124 may operate as in operation S22 of FIG. 8.

At operation S207, the original update table generator 124 may generate a new original update table by merging the original update table and the pre-update table generated at operation S203. For example, the original update table generator 124 may operate as in operation S23 of FIG. 8.

At operation S208, the original update table generator 124 may store the new original update table in the storage medium 200. For example, the original update table generator 124 may operate as in operation S24 of FIG. 8.

According to an embodiment, the P2L memory portion P2LM may store partial P2L tables of a plurality of target memory regions. For example, the write component 110 may use a plurality of target memory regions of the storage medium 200 at the same time to store different types of data in different memory regions or for various reasons. In this case, partial P2L tables corresponding to the plurality of target memory regions, respectively, in which the data are being stored may be generated in the P2L memory portion P2LM. Accordingly, when a map management operation is triggered, the map manager 120 may perform the map management operation on each of the plurality of target memory regions based on a corresponding partial P2L table. In particular, even if the storage medium 200 is performing a write operation on any target memory region when the map management operation is triggered, the pre-update table generator 123 may generate a pre-update table corresponding to each of the plurality of target memory regions.

Figure 10:
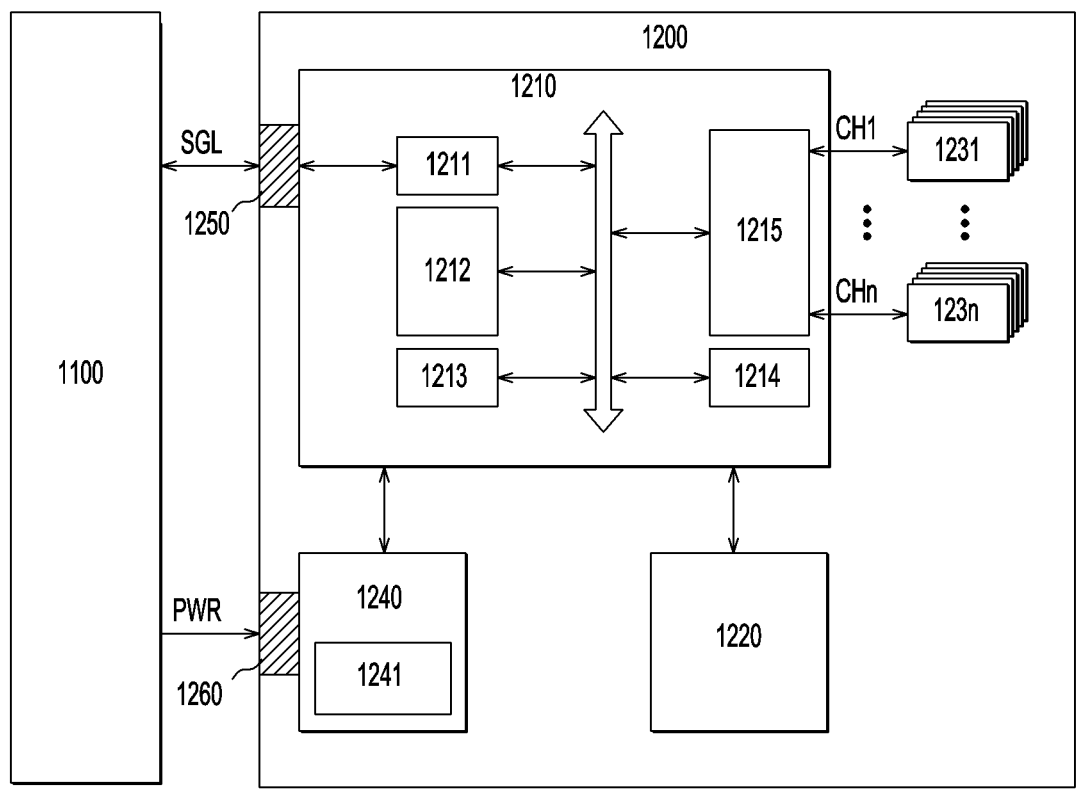
FIG. 10 is a diagram illustrating a data processing system including a solid state drive (SSD) in accordance with an embodiment of the present disclosure.

FIG. 10 is a diagram illustrating a data processing system 1000 including a solid state drive (SSD) 1200 in accordance with an embodiment of the present disclosure. Referring to FIG. 10, the data processing system 1000 may include a host device 1100 and the SSD 1200.

The SSD 1200 may include a controller 1210, a buffer memory device 1220, a plurality of nonvolatile memory devices 1231 to 123n, a power supply 1240, a signal connector 1250, and a power connector 1260.

The controller 1210 may control general operations of the SSD 1200. The controller 1210 may include a host interface 1211, a controller 1212, a random access memory 1213, an error correction code (ECC) component 1214, and a memory interface 1215.

The host interface 1211 may exchange a signal SGL with the host device 1100 through the signal connector 1250. The signal SGL may include a command, an address, data, and so forth. The host interface 1211 may interface the host device 1100 and the SSD 1200 according to the protocol of the host device 1100. For example, the host interface 1211 may communicate with the host device 1100 through any of standard interface protocols such as secure digital, universal serial bus (USB), multimedia card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnect (PCI), PCI express (PCI-E) and universal flash storage (UFS).

The controller 1212 may analyze and process the signal SGL received from the host device 1100. The controller 1212 may control operations of internal function blocks according to a firmware or a software for driving the SSD 1200. The random access memory 1213 may be used as a working memory for driving such a firmware or software.

The controller 1212 may include the write component 110 and the map manager 120 shown in FIG. 1. The random access memory 1213 may include the memory 130 shown in FIG. 1.

The ECC component 1214 may generate the parity data of data to be transmitted to at least one of the nonvolatile memory devices 1231 to 123n. The generated parity data may be stored together with the data in the nonvolatile memory devices 1231 to 123n. The ECC component 1214 may detect an error of the data read from at least one of the nonvolatile memory devices 1231 to 123n, based on the parity data. If a detected error is within a correctable range, the ECC component 1214 may correct the detected error.

The memory interface 1215 may provide control signals such as commands and addresses to at least one of the nonvolatile memory devices 1231 to 123n, according to control of the controller 1212. Moreover, the memory interface 1215 may exchange data with at least one of the nonvolatile memory devices 1231 to 123n, according to control of the controller 1212. For example, the memory interface 1215 may provide the data stored in the buffer memory device 1220, to at least one of the nonvolatile memory devices 1231 to 123n, or provide the data read from at least one of the nonvolatile memory devices 1231 to 123n, to the buffer memory device 1220.

The buffer memory device 1220 may temporarily store data to be stored in at least one of the nonvolatile memory devices 1231 to 123n. Further, the buffer memory device 1220 may temporarily store the data read from at least one of the nonvolatile memory devices 1231 to 123n. The data temporarily stored in the buffer memory device 1220 may be transmitted to the host device 1100 or at least one of the nonvolatile memory devices 1231 to 123n according to control of the controller 1210.

The nonvolatile memory devices 1231 to 123n may be used as storage media of the SSD 1200. The nonvolatile memory devices 1231 to 123n may be coupled with the controller 1210 through a plurality of channels CH1 to CHn, respectively. One or more nonvolatile memory devices may be coupled to one channel. The nonvolatile memory devices coupled to each channel may be coupled to the same signal bus and data bus.

The power supply 1240 may provide power PWR inputted through the power connector 1260, to the inside of the SSD 1200. The power supply 1240 may include an auxiliary power supply 1241. The auxiliary power supply 1241 may supply power to allow the SSD 1200 to be normally terminated when a sudden power-off occurs. The auxiliary power supply 1241 may include large capacity capacitors.

The signal connector 1250 may be configured by various types of connectors depending on an interface scheme between the host device 1100 and the SSD 1200.

The power connector 1260 may be configured by various types of connectors depending on a power supply scheme of the host device 1100.

Figure 11:
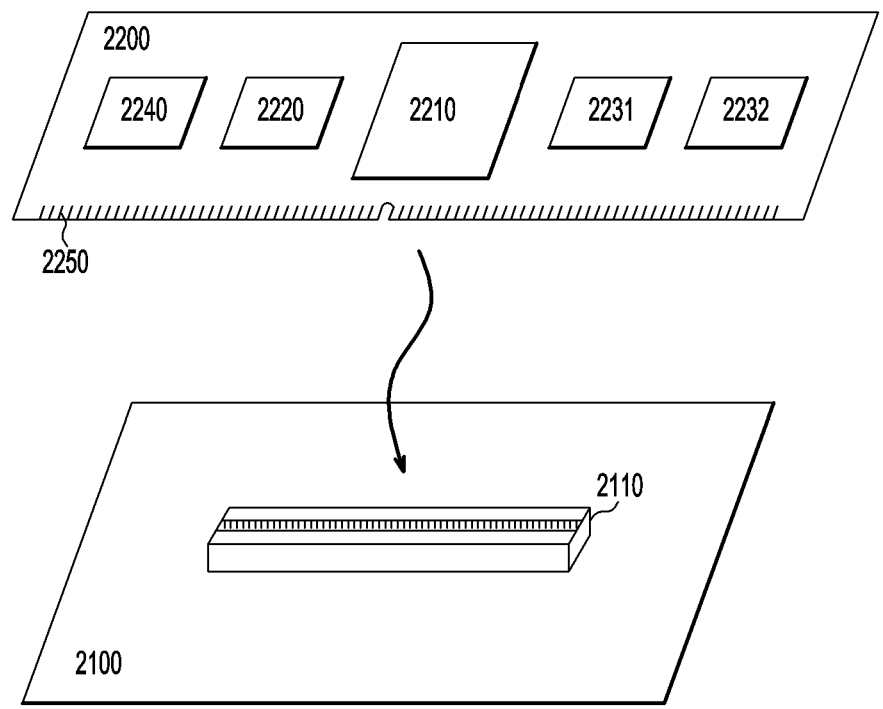
FIG. 11 is a diagram illustrating a data processing system including a memory system in accordance with an embodiment of the present disclosure.

FIG. 11 is a diagram illustrating a data processing system 2000 including a memory system 2200 in accordance with an embodiment of the present disclosure. Referring to FIG.

11, the data processing system 2000 may include a host device 2100 and the memory system 2200.

The host device 2100 may be configured in the form of a board such as a printed circuit board. Although not shown, the host device 2100 may include internal function blocks for performing the function of a host device.

The host device 2100 may include a connection terminal 2110 such as a socket, a slot or a connector. The memory system 2200 may be mounted to the connection terminal 2110.

The memory system 2200 may be configured in the form of a board such as a printed circuit board. The memory system 2200 may be referred to as a memory module or a memory card. The memory system 2200 may include a controller 2210, a buffer memory device 2220, nonvolatile memory devices 2231 and 2232, a power management integrated circuit (PMIC) 2240, and a connection terminal 2250.

The controller 2210 may control general operations of the memory system 2200. The controller 2210 may be configured in the same manner as the controller 1210 shown in FIG. 10.

The buffer memory device 2220 may temporarily store data to be stored in the nonvolatile memory devices 2231 and 2232. Further, the buffer memory device 2220 may temporarily store the data read from the nonvolatile memory devices 2231 and 2232. The data temporarily stored in the buffer memory device 2220 may be transmitted to the host device 2100 or the nonvolatile memory devices 2231 and 2232 according to control of the controller 2210.

The nonvolatile memory devices 2231 and 2232 may be used as storage media of the memory system 2200.

The PMIC 2240 may provide the power inputted through the connection terminal 2250, to the inside of the memory system 2200. The PMIC 2240 may manage the power of the memory system 2200 according to control of the controller 2210.

The connection terminal 2250 may be coupled to the connection terminal 2110 of the host device 2100. Through the connection terminal 2250, signals such as commands, addresses, data and so forth and power may be transferred between the host device 2100 and the memory system 2200. The connection terminal 2250 may be configured into various types depending on an interface scheme between the host device 2100 and the memory system 2200. The connection terminal 2250 may be disposed on any side of the memory system 2200.

Figure 12:
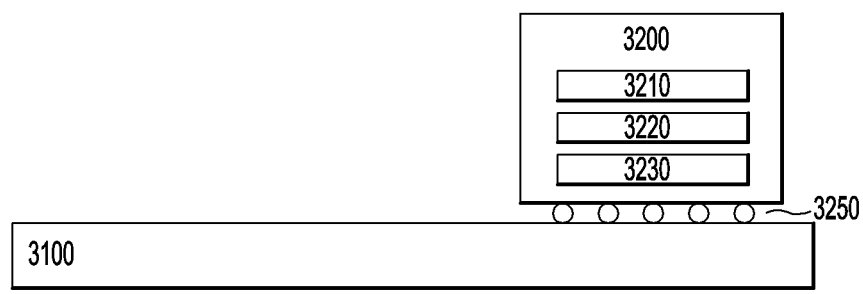
FIG. 12 is a diagram illustrating a data processing system including a memory system in accordance with an embodiment of the present disclosure.

FIG. 12 is a diagram illustrating a data processing system 3000 including a memory system 3200 in accordance with an embodiment of the present disclosure. Referring to FIG. 12, the data processing system 3000 may include a host device 3100 and the memory system 3200.

The host device 3100 may be configured in the form of a board such as a printed circuit board. Although not shown, the host device 3100 may include internal function blocks for performing the function of a host device.

The memory system 3200 may be configured in the form of a surface-mounting type package. The memory system 3200 may be mounted to the host device 3100 through solder balls 3250. The memory system 3200 may include a controller 3210, a buffer memory device 3220, and a nonvolatile memory device 3230.

The controller 3210 may control general operations of the memory system 3200. The controller 3210 may be configured in the same manner as the controller 1210 shown in FIG. 10.

The buffer memory device 3220 may temporarily store data to be stored in the nonvolatile memory device 3230. Further, the buffer memory device 3220 may temporarily store the data read from the nonvolatile memory device 3230. The data temporarily stored in the buffer memory device 3220 may be transmitted to the host device 3100 or the nonvolatile memory device 3230 according to control of the controller 3210.

The nonvolatile memory device 3230 may be used as the storage medium of the memory system 3200.

Figure 13:
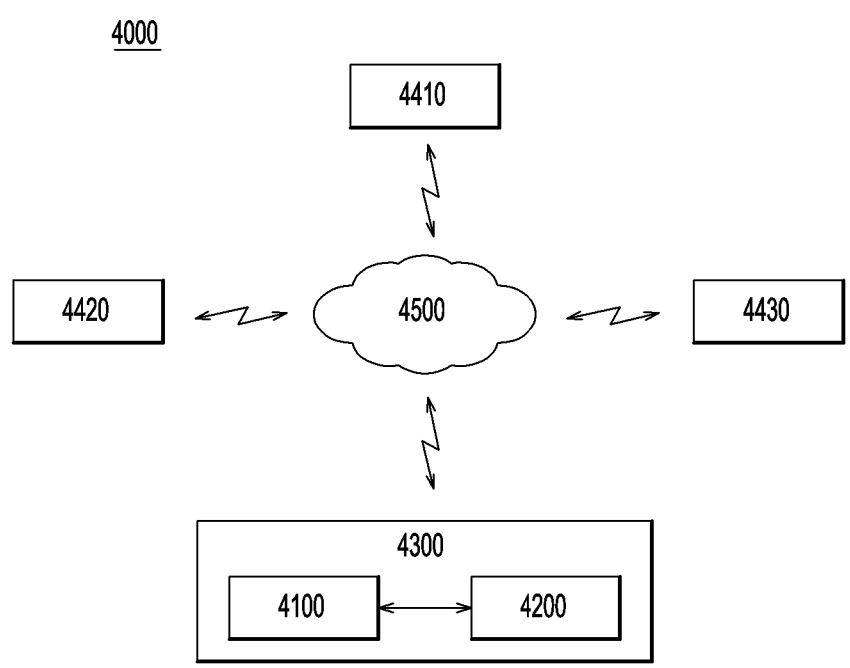
FIG. 13 is a diagram illustrating a network system including a memory system in accordance with an embodiment of the present disclosure.

FIG. 13 is a diagram illustrating a network system 4000 including a memory system 4200 in accordance with an embodiment of the present disclosure. Referring to FIG. 13, the network system 4000 may include a server system 4300 and a plurality of client systems 4410 to 4430 which are coupled through a network 4500.

The server system 4300 may service data in response to requests from the plurality of client systems 4410 to 4430. For example, the server system 4300 may store the data provided from the plurality of client systems 4410 to 4430. For another example, the server system 4300 may provide data to the plurality of client systems 4410 to 4430.

The server system 4300 may include a host device 4100 and the memory system 4200. The memory system 4200 may be configured by the memory system 10 shown in FIG. 1, the memory system 1200 shown in FIG. 10, the memory system 2200 shown in FIG. 11 or the memory system 3200 shown in FIG. 12.

Figure 14:
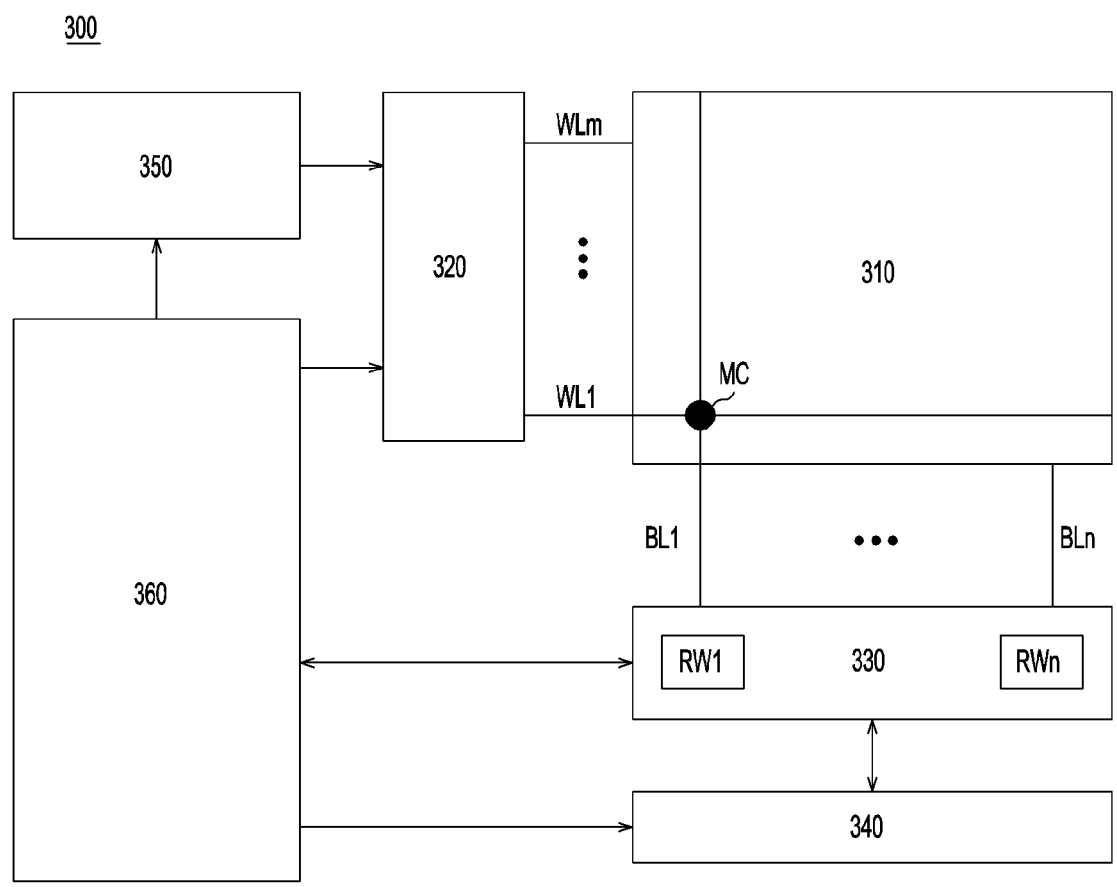
FIG. 14 is a block diagram illustrating a nonvolatile memory device included in a memory system in accordance with an embodiment of the present disclosure.

FIG. 14 is a block diagram illustrating a nonvolatile memory device 300 included in a memory system in accordance with an embodiment of the present disclosure. Referring to FIG. 14, the nonvolatile memory device 300 may include a memory cell array 310, a row decoder 320, a data read/write block 330, a column decoder 340, a voltage generator 350, and a control logic 360.

The memory cell array 310 may include memory cells MC which are arranged at areas where word lines WL1 to WLm and bit lines BL1 to BLn intersect with each other.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

The memory system and the operating method thereof according to embodiments of the present disclosure can efficiently perform a map management operation.

Although various embodiments have been described for illustrative purposes, it will be apparent to those skilled in the art that various changes and modifications may be made without departing from the spirit and scope of the disclosure as defined in the following claims.

What is claimed is:

1. An operating method of a memory system, comprising:
   determining that a map management operation is triggered, based on physical-to-logical (P2L) entries generated after a previous map management operation is completed, wherein the P2L entries respectively correspond to physical addresses of a memory region of a storage medium;
   generating a pre-update table corresponding to the memory region based on the P2L entries regardless of whether a write operation of the storage medium is completed, wherein the pre-update table includes pre-update states respectively corresponding to all logical-to-physical (L2P) segments and each of the pre-update states indicates whether a corresponding L2P segment includes an L2P entry correspond to a logical address included in the P2L entries;
   updating L2P entries based on the P2L entries after the write operation is completed; and
   generating, after the L2P entries are updated, a new original update table by merging the pre-update table and an original update table corresponding to the memory region when the original update table is present in the storage medium and generating, after the L2P entries are updated, the pre-update table as the new original update table when the original update table is not present in the storage medium.

2. The operating method of claim 1, wherein the generating of the pre-update table includes setting each of the pre-update states as a first state when the corresponding L2P segment includes the L2P entry corresponding to the logical address included in the P2L entries and setting as a second state when the corresponding L2P segment does not include any L2P entry corresponding to a logical address included in the P2L entries.

3. The operating method of claim 1, wherein the generating of the pre-update table comprises:
   identifying logical addresses mapped to the physical addresses with reference to the P2L entries, respectively;
   identifying L2P segments respectively including L2P entries respectively corresponding to the identified logical addresses;
   setting, as a first state, pre-update states respectively corresponding to the identified L2P segments; and
   setting, as a second state, pre-update states respectively corresponding to remaining L2P segments except the identified L2P segments of all the L2P segments.

4. The operating method of claim 1, wherein:
   the new original update table includes respective update states of all the L2P segments, and
   wherein each of the update states indicates whether a corresponding L2P segment includes an L2P entry corresponding to a logical address of data stored in the memory region.

5. The operating method of claim 1, wherein:
   the pre-update table and the original update table are bit maps, each having an identical size, and
   wherein each of the bit maps includes bits corresponding to a number of all the L2P segments.

6. The operating method of claim 1, wherein the generating of the new original update table includes generating the new original update table by performing a bitwise OR operation on the pre-update table and the original update table.

7. The operating method of claim 1, further comprising:
   reading, from the storage medium, a final update table corresponding to the memory region when the memory region is selected as a victim of a garbage collection operation;
   identifying L2P segments having an update state of a first state with reference to the final update table;
   reading the identified L2P segments from the storage medium; and
   identifying valid data stored in the memory region by checking physical addresses of the memory region in L2P entries included in the read L2P segments.

8. The operating method of claim 1, wherein the updating of the L2P entries based on the P2L entries after the write operation is completed comprises:
   identifying a first logical address mapped to a first physical address in a first P2L entry among the P2L entries;
   reading, from the storage medium, a first L2P segment including a first L2P entry corresponding to the first logical address;
   updating the first L2P entry so that the first physical address is mapped to the first logical address in the first L2P entry; and
   storing the first L2P segment, which includes the updated first L2P entry, in the storage medium.

9. An operating method of a memory system, comprising:
   generating physical-to-logical (P2L) entries respectively corresponding to physical addresses of a memory region of a storage medium, wherein the P2L entries include logical addresses mapped to the physical addresses, respectively;
   generating a pre-update table by setting, as a first state, pre-update states of first L2P segments including logical-to-physical (L2P) entries respectively corresponding to the logical addresses among all L2P segments and setting, as a second state, pre-update states of second L2P segments except the first L2P segments among all the L2P segments, when the storage medium is performing a write operation when a map management operation is triggered; and generating, after the write operation is completed, a new original update table by merging the pre-update table and an original update table corresponding to the memory region when the original update table is present in the storage medium and generating, after the write operation is completed, the pre-update table as the new original update table when the original update table is not present in the storage medium.

10. The operating method of claim 9, further comprising updating the L2P entries based on the P2L entries after the write operation is completed.

11. The operating method of claim 9, wherein:
the new original update table comprises respective update states of all the L2P segments, and
each of the update states indicates whether a corresponding L2P segment includes an L2P entry corresponding to a logical address of data stored in the memory region.

12. The operating method of claim 9, wherein:
the pre-update table and the original update table are bit maps, each having an identical size, and
the bit map includes bits corresponding to a number of all the L2P segments.

13. The operating method of claim 9, wherein the generating of the new original update table includes generating the new original update table by performing a bitwise OR operation on the pre-update table and the original update table.

14. A memory system comprising:
a logical-to-physical (L2P) update component suitable for updating, when a map management operation is triggered, L2P entries based on physical-to-logical (P2L) entries generated after a previous map management operation is completed, wherein the P2L entries respectively include logical addresses mapped to physical addresses of a memory region of a storage medium and the L2P entries respectively include the physical addresses mapped to the logical addresses;
a pre-update table generator suitable for generating, before the L2P entries are updated, a pre-update table including respective pre-update states of all L2P segments by setting, as a first state, the pre-update states of the L2P segments including the L2P entries to be updated; and
an original update table generator suitable for generating, after the L2P entries are updated, a new original update table by merging the pre-update table and an original update table corresponding to the memory region when the original update table is present in the storage medium and generating, after the L2P entries are updated, the pre-update table as the new original update table when the original update table is not present in the storage medium.

15. The memory system of claim 14, wherein the L2P update component updates, when the map management operation is triggered, the L2P entries after a write operation being performed by the storage medium is completed.

16. The memory system of claim 14, wherein the pre-update table generator generates, when the map management operation is triggered, the pre-update table regardless of a completion of a write operation being performed by the storage medium.

17. The memory system of claim 14, wherein the pre-update table generator further generates the pre-update table by setting, as a second state, the pre-update states of remaining L2P segments except the L2P segments including the L2P entries to be updated among all the L2P segments.

18. The memory system of claim 14, wherein:
the new original update table includes respective update states of all the L2P segments, and
each of the update states indicates whether a corresponding L2P segment includes an L2P entry corresponding to a logical address of data stored in the memory region.

19. The memory system of claim 14, wherein:
the pre-update table and the original update table are bit maps, each having an identical size, and
the bit map includes bits corresponding to a number of all the L2P segments.

20. The memory system of claim 14, wherein the original update table generator generates the new original update table by performing a bitwise OR operation on the pre-update table and the original update table.

* * * * *